Jan. 18, 1944.    G. L. WEBER    2,339,534
PLANTER
Filed July 25, 1941    3 Sheets-Sheet 2
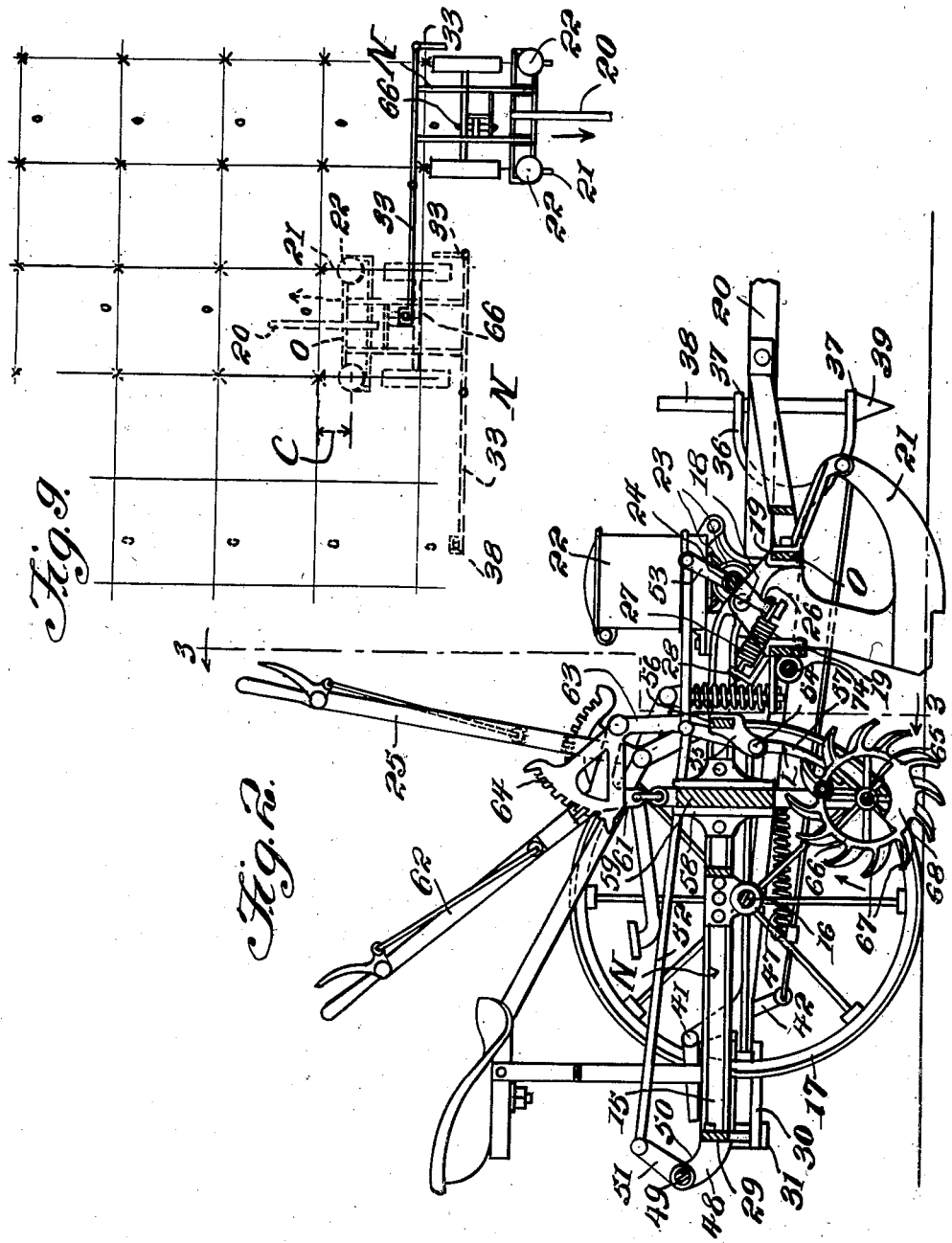
Gustave L. Weber
INVENTOR
BY Victor J. Evans & Co.
ATTORNEYS

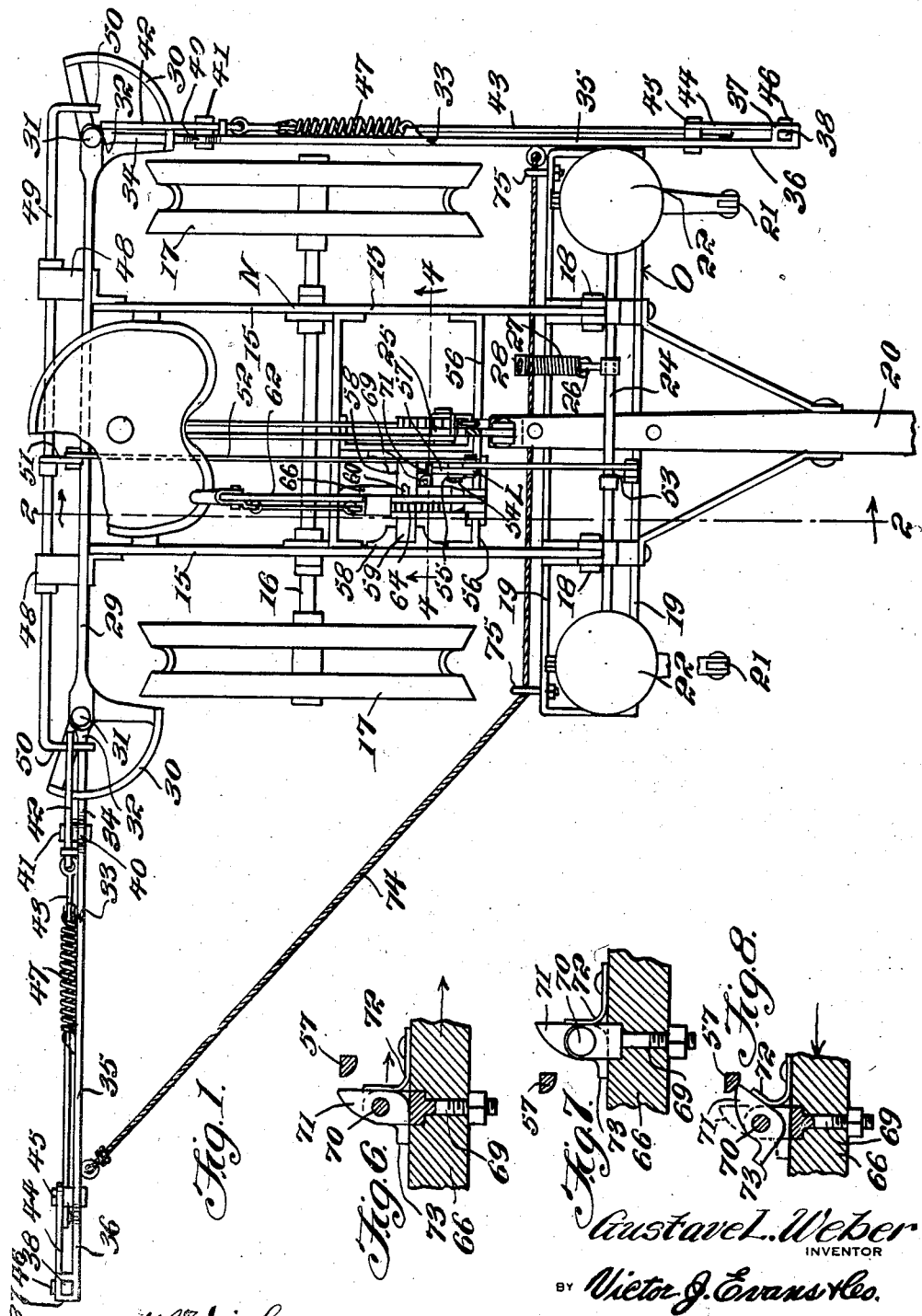

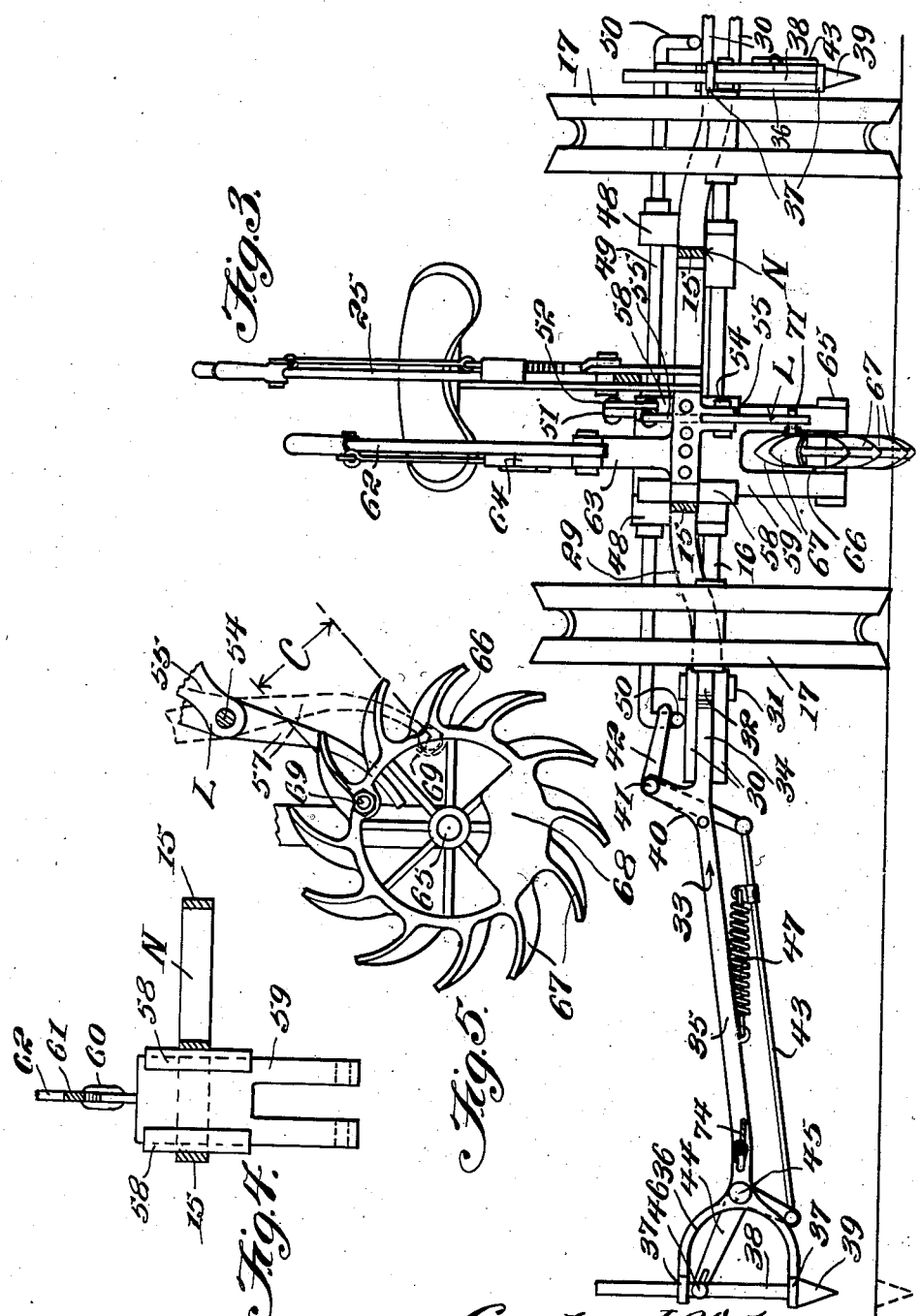

Patented Jan. 18, 1944

2,339,534

UNITED STATES PATENT OFFICE 2,339,534

PLANTER

Gustave L. Weber, Medora, Ill.

Application July 25, 1941, Serial No. 404,083

4 Claims. (Cl. 111—30)

The present invention relates to new and useful improvements in machines for planting corn and the like and has particular reference to a planter of the check rower type.

An object of the invention is to provide a planter of generally improved design.

Another object of the invention is the provision of a planter embodying improved seed drop operating mechanism.

A further object of the invention is to provide a planter having means for accurately setting the drop actuating mechanism.

Still another object of the invention is the provision of a planter of the above character embodying improved marking apparatus.

A still further object of the invention is to provide a planter of the aforesaid character operable to simultaneously actuate the marker and the seed releasing mechanism.

A still further object of the invention is to provide a planter of the above character which is relatively simple and durable in construction and efficient in operation.

Other objects and advantages of the invention will become apparent as the description progresses.

In the accompanying drawings, which illustrate a preferred embodiment of the invention:

Figure 1 is a top plan view of the assembled machine,

Figure 2 is a longitudinal section taken on line 2—2 of Figure 1,

Figure 3 is a transverse section taken on line 3—3 of Figure 2,

Figure 4 is a detail section taken approximately on line 4—4 of Figure 1,

Figure 5 is an enlarged fragmentary side elevational view of the operating wheel, Figure 6 is an enlarged fragmentary sectional view through the said wheel in one position with relation to a rocker element operable thereby, Figure 7 is a similar view with the parts in a different position, Figure 8 is a similar view showing the trip element carried by the wheel in rocker engaging position, and Figure 9 is a diagrammatic plan view illustrating the check row operation of the machine.

Referring in detail to the drawings, wherein like numerals of reference are employed to designate corresponding parts throughout, N designates the main frame of the apparatus having pivotally attached thereto a front auxiliary frame O. These frames, which are essentially of preferred conventional construction, embody a pair of spaced longitudinal main frame bars 15 to which is secured a transversely extending axle 16 having carrier wheels 17 mounted on the ends thereof. To the forward ends of the bars 15 are connected, by pivots 18, the angular transverse members 19 of the front frame O to which is connected the inner end of a tongue 20, or like draft element, and which carries at each end a vertically depending furrow opener 21. The chutes of these furrow openers are disposed to receive seeds from a pair of seed containers 22 fastened on the frame O and from which the seeds are periodically released by dropping mechanism which may embody bevel gears 23 operable to actuate drop plates through the medium of a transversely extending shaft 24 journaled on the auxiliary frame. The auxiliary frame is tiltable, to vary the depth of the furrow openers 21, by means of a hand lever 25 connecting with the auxiliary frame in a well-known manner.

To the shaft 24 is connected a depending arm 26 having its outer end connected to one end of a tension spring 27, the opposite end of the spring being fastened to a bracket 28 attached to the auxiliary frame.

Secured to the rear ends of the frame bars 15 and extending transversely thereof is a rear bar 29 formed at each end to provide a pair of horizontally disposed complementary segmental guide members 30, the inner portions of which are provided with vertically aligned bearing openings through which is extended a pivot pin 31. The intermediate portion of this pin extends through an eye 32 formed at the inner face of an elongated arm 33 embodying a bar having an inner portion 34 which extends horizontally in assembly and merges into a longer section 35 designed to assume a downward inclination at its outer end. At this outer end portion of the arm 33 is formed an approximately U-shaped yoke 36 having vertically aligned eyes 37 in its end portions. In the apertured ends of this yoke is mounted a slidable marker element composed of a stem 38 formed at its lower end with a conical tip 39. At the juncture of the parts 34 and 35 the arm 33 is formed with an upwardly directed lug 40 apertured at its upper end to engage a horizontally disposed pivot pin 41.

The pivot pin 41 of each arm 33 functions to support a vertically disposed angular bell crank lever 42 having pivotally connected to the bottom end of its depending arm the inner end of a connecting rod 43. The outer end of this rod is pivotally connected with the end of a depending arm of an angle bell crank lever 44 supported on a pivot 45 extending through an aperture at the inner end of the yoke 36. The outer slotted end of the transversely projected longer arm of the bell crank lever 44 is connected, by a pivot 46, with the intermediate portion of the stem 39 so that, through movement of the vertically disposed lever 44, the stem may be vertically reciprocated. A tension spring 47 having one end connected with an ear on the intermediate portion of the arm 33 and the opposite end connected with a bracket secured to the connecting rod 43 serves to yieldingly pull this rod outwardly with relation to the arm and to swing the lever 44 to such position that it elevates the marker 38, as shown to advantage at Figure 3.

In a pair of bearing brackets 48 secured to and extending rearwardly from the longitudinal frame bars 15 is journaled a transversely extending rock shaft 49 bent at each end to form an angular actuating projection 50 shaped to extend beneath and operatively engage the inwardly directed element of each of the bell crank levers 42 to actuate the same.

To an arm 51 secured on the rock shaft 49 is pivotally connected the rear end of a longitudinally extending rod 52 having its forward end pivotally connected to the outer end of an arm 53 secured to the forward shaft 24. At the intermediate portion of rod 52 is pivotally connected the upper end of a vertically disposed lever L having its medial portion fulcrumed on a pivot 54 secured transversely to the depending end of a bracket 55 fastened to a cross brace 56 on the main frame. The lower arm 57 of this lever is curved longitudinally and has a diminishing taper toward the outer extremity as shown to advantage at Figure 5.

Secured in transversely opposed complementary relation on the main frame end are a pair of guide channels 58 adapted to slidably engage an elongated member 59 in the form of a rectangular shaped plate having its lower portion bifurcated. To the top of the plate 59 is connected, through a connecting link 60, the depending projection or lug 61 of a lever 62 having its end portion pivotally connected to an upstanding bracket bar 63 to which is also connected a notched segment 64. The lever 62 carries conventional locking mechanism cooperative with the notches of the fixed segment 64 for securing the lever in selectively adjusted position.

At the lower portion of the slide plate 59 is mounted a transversely disposed shaft 65 rotatably supporting a vertically disposed operating wheel 66. On the circumference of the rim of this wheel are formed outwardly projecting curved teeth 67 while within a segmental portion of the rim is formed a sector-shaped weight forming web 68 arranged eccentrically of the wheel so as to dispose the latter in a predetermined position when it is elevated. At a position diametrically opposed to the web 68 the rim carries an eye bolt 69 extending axially of the wheel so that the apertured portion projects from one side of the rim to support a pivot 70. The element 69 pivotally supports thereon a tripper element 71 having an essentially cam-shaped body formed with one straight edge and an opposed curved edge yieldingly held in laterally projecting position by means of an angular leaf spring 72 fastened to the wheel rim and bearing against the straight edge of the tripping cam. At its inner portion this cam element is formed with an angularly protruding lip 73 designed to bear against the side of the wheel rim to limit the backward movement of the cam under the action of the spring 72, as shown to advantage at Figures 6 to 8 inclusive. As illustrated in these figures this tripping cam is adapted to assume coacting relation with the lower curved arm 57 of the lever L to operatively trip this lever when the wheel is turned in one direction and to move past this lever arm when the wheel rotates in the opposite direction wherein the lever wipes across the curved edge and turns the cam against the force of the retaining spring 72.

The two marker supporting arms on the respective sides of the main frame are preferably connected by a flexible element 74, such as a rope, which is fastened to the end portions of the arms and trained through guide eyes 75 attached to the front frame O so that when one arm is moved to laterally extended operative arrangement the complementary arm will be swung inward to a longitudinally arranged retracted position along the side of the frame, as clearly shown at Figure 1.

As the machine is drawn along the ground to effect a planting operation the wheel 66 is lowered so that its teeth engage the ground to turn the same. During each revolution of the operating wheel the trip element 71 thereof engages the lever L to effect a predetermined swinging movement as a result of which the rod 52 is moved rearwardly on the frames. This action causes the arm 53 to turn the dropper shaft 24 through a predetermined angular movement to release the desired number of kernels of corn or the like from the seed containers for droppage through the chutes of the furrow openers into the soil. Simultaneously with this action the rearward movement of the rod 52 turns the shaft 29 through the medium of the arm 51 so as to elevate the coacting arm of the bell crank lever 42 of the operatively extended marker arm and cause depression of the reciprocatory marker element 39 to form a marking depression in the ground laterally of the planted hills. The spring 27 actuates the shaft 24, through the medium of the arm 26, and returns rod 52 to its normal forward position to move the proper seed plates to closure arrangement and release the marker mechanism so that spring 47 elevates the mark stem. When the planting of the initial row is completed the operating wheel 66 is elevated to an inoperative position out of contact with the ground and the machine is turned to start the second row.

The weight 68 on the operating wheel functions, by gravity, to automatically set the tripping cam 71 slightly forward of the highest point of this wheel in position to trip the rocker lever. Thus, when the machine attains a predetermined position with relation to the first marker impression, as it is drawn along the second row, the wheel 66 is lowered into contact with the ground and trips the lever L, the machine traveling a distance C indicated at Figure 9, between the initial tripping operation and the planting of the seed. Through operation of the lever 62 the depth of the teeth 67, into the ground, may be readily regulated in addition to the vertical movement of the wheel to operative and inoperative positions.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. In a planter having a wheeled frame, a marker arm carried by the frame, a marker element slidably mounted on the marker arm for movement into or out of engagement with the ground, a bell crank lever pivoted at its angle to the marker arm and having one of its arms connected to the marker element, a second bell-crank lever pivoted on its angle to the marker arm, a rod pivoted to the remaining arm of said first bell crank lever and to one of the arms of said second bell crank lever, a spring connected to the marker arm and rod normally holding the marker element in raised position, and means associated with the remaining arm of said second bell crank lever for alternately rocking said bell crank lever against the tension of the spring and then releasing the same, whereby to effect the movement of the marker element into and then out of engagement with the ground.

2. In a mechanism of the character set forth in claim 1, wherein said means comprises a shaft rotatably mounted on the frame and having an angular member contacting with the said remaining arm of the second bell crank lever, an arm fixed to the shaft, a lever pivoted to the frame, a rod connecting the arm and said last lever, and means for rocking said last lever.

3. In a mechanism of the character set forth in claim 1, wherein said means comprises a shaft rotatably mounted on the frame and having an angular member contacting with the said remaining arm of the second bell crank lever, an arm fixed to the shaft, a lever pivoted to the frame, a rod connecting the arm and said last lever, and means for rocking said last lever, and wherein the marker arm is pivotally connected to the frame for movement into parallel or angular position with respect to the frame, the pivot of the marker arm bearing such relation to said angular member and said remaining arm as to cause said remaining arm to occupy an inoperative position with relation to said angular member when the marker arm is parallel to the frame and to cause said remaining arm to occupy an operative position with relation to said angular member when the marker arm is in angular position with relation to the frame.

4. In a mechanism of the character set forth in claim 1, wherein said means comprises a shaft rotatably mounted on the frame and having an angular member contacting with the said remaining arm of the second bell crank lever, an arm fixed to the shaft, a lever pivoted between its ends to the frame, a rod connected to the arm and to the upper end of said last lever, a ground engaging wheel rotatably suspended from the frame and weighted at one side of its axis, and a tripper element carried by said wheel opposite the weights for contact with the lower portion of said last lever to effect the operation of the marker element.

GUSTAVE L. WEBER.